United States Patent [19]

Leverberg et al.

[11] Patent Number: 4,638,668
[45] Date of Patent: Jan. 27, 1987

[54] MEASUREMENT COUPLING FOR FLUIDIC SYSTEMS

[75] Inventors: Siegfried Leverberg, Oberhausen; Manfred Hofmann, Altendiez, both of Fed. Rep. of Germany

[73] Assignee: Hydrotechnik GmbH, Limburg, Fed. Rep. of Germany

[21] Appl. No.: 672,640

[22] Filed: Nov. 19, 1984

[30] Foreign Application Priority Data

Nov. 19, 1983 [DE] Fed. Rep. of Germany ....... 3341860

[51] Int. Cl.⁴ ............... G01D 21/02; G01L 19/00; G01K 1/14
[52] U.S. Cl. ............... 73/866.5; 251/149.7; 137/322; 73/756; 374/143; 374/208
[58] Field of Search ............ 73/432 B, 432 R, 756; 374/208, 147, 148, 150, 143; 251/149.6, 149.7; 137/322

[56] References Cited

U.S. PATENT DOCUMENTS

| | | | |
|---|---|---|---|
| 2,815,663 | 12/1957 | Lupfer | 374/208 |
| 3,115,033 | 12/1963 | Blowers | 73/756 |
| 3,167,733 | 1/1965 | Di Noia | 374/148 X |
| 3,188,866 | 6/1965 | Mayer | 374/148 X |
| 3,691,846 | 9/1972 | Ingold | 73/432 B |
| 3,825,222 | 7/1974 | Petrova | 251/149.6 |
| 3,999,430 | 12/1976 | Parduhn | 73/756 X |
| 4,096,754 | 6/1978 | Beveridge, Jr. et al. | 73/432 B |
| 4,186,910 | 2/1980 | Higami | 251/149.6 |
| 4,289,027 | 9/1981 | Gleaves et al. | 73/756 X |
| 4,346,611 | 8/1982 | Welker | 73/432 B X |
| 4,391,289 | 7/1983 | Adams | 73/756 X |

FOREIGN PATENT DOCUMENTS

| | | | |
|---|---|---|---|
| 845400 | 6/1970 | Canada | 374/143 |
| 312032 | 5/1919 | Fed. Rep. of Germany | 374/148 |
| 1998340 | 3/1968 | Fed. Rep. of Germany | . |
| 3202422 | 7/1983 | Fed. Rep. of Germany | . |
| 8317775 | 12/1983 | Fed. Rep. of Germany | 73/432 B |
| 8416303 | 5/1984 | Fed. Rep. of Germany | . |
| 122927 | 9/1981 | Japan | 73/756 |
| 355167 | 8/1961 | Switzerland | 251/149.7 |
| 706356 | 3/1954 | United Kingdom | 73/756 |

OTHER PUBLICATIONS

"Maschinen, Gerate und Verfahren", VDI-Z 118 (1976) Nr. 23—Dezember (I).

Primary Examiner—Howard A. Birmiel
Assistant Examiner—Tom Noland
Attorney, Agent, or Firm—Robert J. Koch

[57] ABSTRACT

The invention relates to a measurement coupling for fluid systems, for taking working pressures or temperatures of the fluid media, consisting of a coupling bushing which is under duct pressure in the built-in state, and in the bore of which is arranged a spring-loaded and mechanically actuatable check valve, the check valve being constructed as a valve body provided with a cylindrical bore and a closed bottom face, the end of the coupling bushing facing the fluid system being prolonged beyond the valve body. A radial transverse bore or a radial slot is located in the wall of the valve body. In a further embodiment of the invention, the radial transverse bore or the transverse slot is formed in the wall of the guide part of the valve body and a flow slot channel is formed between the valve body and the coupling bushing as far as the radial transverse bore or transverse slot.

18 Claims, 6 Drawing Figures

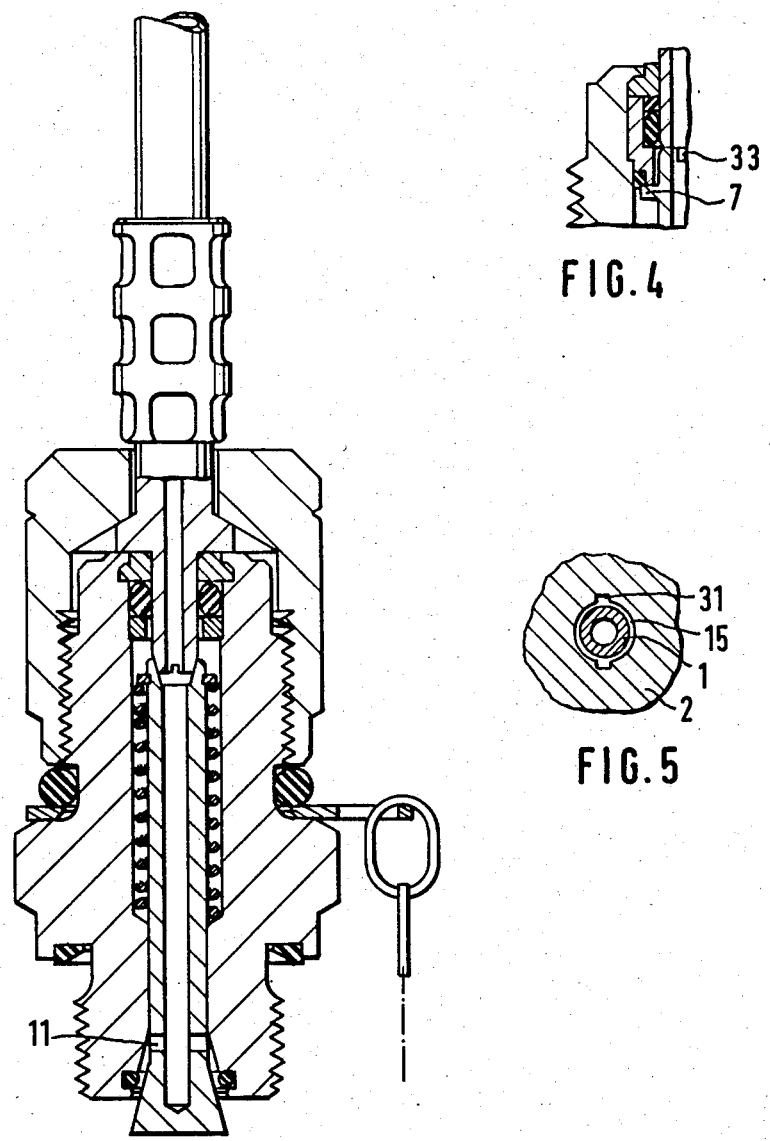
FIG. 6
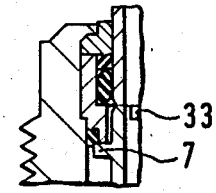
FIG. 4
FIG. 5

MEASUREMENT COUPLING FOR FLUIDIC SYSTEMS

BACKGROUND OF THE INVENTION

1. Field of the Invention

The invention relates to a measurement coupling for fluid systems, for taking working pressures or temperatures of fluid media, consisting of a coupling sleeve which is under duct pressure in the built-in state, and in the bore of which is arranged a spring-loaded and mechanically actuatable check valve.

2. Description of the Related Art

Measurement couplings of the kind mentioned above are already known and are used, for example, for producing test or measurement connections to pressure ducts, the coupling bushing being as a rule installed, with its screw-in thread, fixed to the pressure duct of a fluid system. A sealing nipple, formed as a hollow pin, is screwed by means of a screwed cap onto this coupling bushing for the duration of the test or measurement work, and is connected fixedly to a hose. The couplings can, for example, be connected under pressure, i.e., without stopping the plant, to the corresponding measuring equipments via measurement hoses. In connecting up to fixedly installed equipment, for example, manometers, manometer selector switches, electrical pressure transducers and pressure switches, the flexible measurement hoses can be disposed like electrical cables, so that there is no expensive laying of pipes. The effective working pressure can thus be measured directly in the fluid duct with such measurement couplings, no undoing of vent screws and pipe screw connections being required. Such couplings are used in the most varied constructional elements and controls of fluid systems. After parting of the coupling connection, a protective cap is screwed onto the coupling bushing with external thread, and has the purpose of preventing dirt entering the coupling bushing; the protective cap furthermore takes over an additional sealing function in the caes in which a check valve installed in the coupling bushing does not close absolutely tightly.

For measurement of the temperatures of the fluid medium, equally good measurement couplings are not at present known. The temperatures of fluid media have hitherto been measured with fixedly installed temperature sensors which lie in the liquid flow path of the system, or else hermetically sealed dip tubes were used, with temperature sensors built in.

The fixedly installed temperature sensors have the disadvantage that in the case of servicing, a change of temperature sensor can be carried out, very disadvantageously, only when the plant is stopped.

In installations with dip tubes, in many cases, due to ignorance of the requirements of measurement technology, it is not the desired temperature of the medium which is measured, but the housing temperature, or an intermediate value which deviates from the desired temperature of the medium and is thus erroneous.

U.S. Pat. No. 4,096,754 teaches a measurement coupling for fluid systems, for taking working pressures and temperatures, with the measuring probe extending, in the operating state, through a mechanically actuatable ball valve. When the probe is removed from the measurement coupling, the valve has to be closed immediately after the probe has passed through the valve. Positiveness of the valve setting is thus not achieved, so that faulty operation cannot be excluded. Furthermore, removing the probe is very costly, both mechanically and as regards handling; and finally, the space requirement is considerable, because of the required rotary valve, so that the measurement coupling cannot be used in places to which access is difficult.

SUMMARY OF THE INVENTION

The object of the present invention is therefore to propose, while using the measurement coupling which is known per se, a modification of it such that both the pressure of the system and also the temperature of the fluid medium can be measured, only the connection to the pressure equipment having to be exchanged for a temperature sensor during operation, while the measurement coupling remains fixedly installed in the system. The fluid system hence does not have to be switched over to be depressurized during the said exchange, according to the task set.

According to the invention, this object is achieved in that the check valve is constructed as a valve body provided with a cylindrical bore and a closed bottom face, and the end of the coupling bushing facing the fluid system is prolonged beyond the valve body; and in that a radial transverse bore or a transverse slot is located in the wall of the valve body.

The radial transverse bore or the transverse slot can be arranged in the lower part of the valve body, which is immersed in the fluid system, so that the fluid medium can penetrate through these openings directly into the valve body.

However, it is also advantageous, according to the invention, if the radial transverse bore or the transverse slot is located in the wall of the guide part of the valve body, a flow slot channel being formed between the valve body and the coupling sleeve as far as the radial transverse bore or transverse slot.

The transverse bore or the transverse slot make possible, in cooperation with the flow slot channel, the unhindered inflow of the fluid medium through the valve body to the mesuring equipment, so that the pressure existing in the system always propagates, during pressure measurements, via the radial transverse bore or the transverse slot, and the true pressure is measured.

Furthermore, by these means according to the invention, any gas which may be present in the valve body and acts as an insulator is compressed during temperature measurements in the liquid medium, so that good heat transfer to the temperature sensor by direct contact is always provided for, and rapid dynamic temperature changes are thus picked up.

The valve body advantageously has a collar which is formed about the valve body, forms a sealing face, and at the same time is constructed as a stop for the cylindrical compression spring.

The end face of the valve body is constructed as a flat, planar face or as a conical mouth so that, according to the shape of the nipple of the connecting fitting, a good fit is obtained.

In a development of the invention, the valve body has a stop shoulder which is constructed such that it strikes against the stop face of the coupling bushing while the guide part still remains in the bushing bore, so that sufficient and secure guiding of the valve body is provided.

The bore of the lower part of the coupling bushing is provided with a greater diameter than the remaining portion of the bore, such that a cylindrical vortex chamber is formed with the tapered portion of the valve. The fluid medium thus bathes the valve body over a relatively great part of its length, thus providing for good temperature adaptation or temperature transfer.

For further improvement of this effect, the vortex chamber is provided with a conical widening in its lower portion, which faces the fluid medium.

In an advantageous further development of the invention, the electrical temperature sensor, which can be screwed on, has a tapering sensor tip with a conical transition.

A torsional securement ring is arranged, under prestress, in the thread relief of the coupling bushing and the recess of the screwed cap.

Furthermore, according to the invention, a guide aperture is provided in combination with notches located in the coupling bushing, so that a free throughflow cross section results which corresponds to the nominal width of the pressure tubing to be connected.

An O-ring and a support ring are arranged in the widened bore of the bushing guide part.

The coupling thread is preferably developed as a buttress thread.

BRIEF DESCRIPTION OF THE DRAWINGS

The invention will be explained in detail with reference to the drawing, in which various embodiment examples are shown.

FIG. 4 shows a portion of FIGS. 1-3, illustrating a portion of the bushing guide part with the valve body, the latter having a right planar surface;

FIG. 5 shows a partial section A - B of FIG. 1, and

FIG. 6 shows a further embodiment of the measurement coupling with a transverse bore in the lower part of the valve body.

In the Figures, like elements are denoted by like reference symbols.

DETAILED DESCRIPTION OF THE PREFERRED EMBODIMENT

Figures 1, 2:
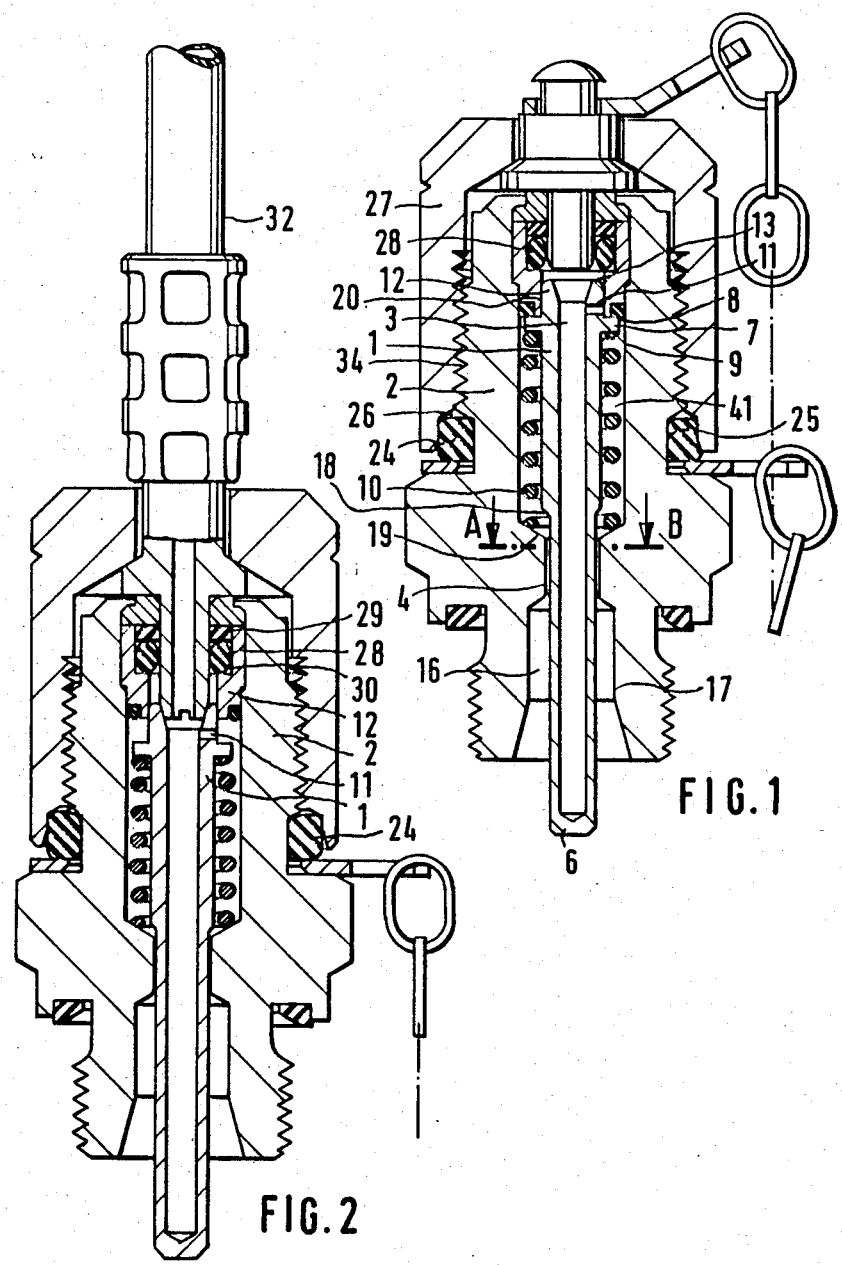
FIG. 1 shows a longitudinal section through the measurement coupling according to the invention, for picking up temperatures and pressures, with a steel screw cap placed in position.
FIG. 2 shows a longitudinal section through the measurement coupling according to the invention, for picking up temperatures and pressures, with a high pressure hose connected for pressure measurements.

FIG. 1 shows in cross section a measurement coupling which is used for temperature or pressure measurement. The measurement coupling is screwed to a screwed cap 27, which is to be removed when measurements are intended and which provides for protection against dirt. In addition to this, the screwed cap, formed as a protective cap, offers still greater security against leakages from the check valve, should these occur there.

The check valve of the measurement coupling is constructed as a valve body 1 provided with cylindrical bore 3 and a closed bottom surface 6; the valve body 1 is prolonged beyond the end of the coupling bushing 2 facing the fluid system.

Figure 3:
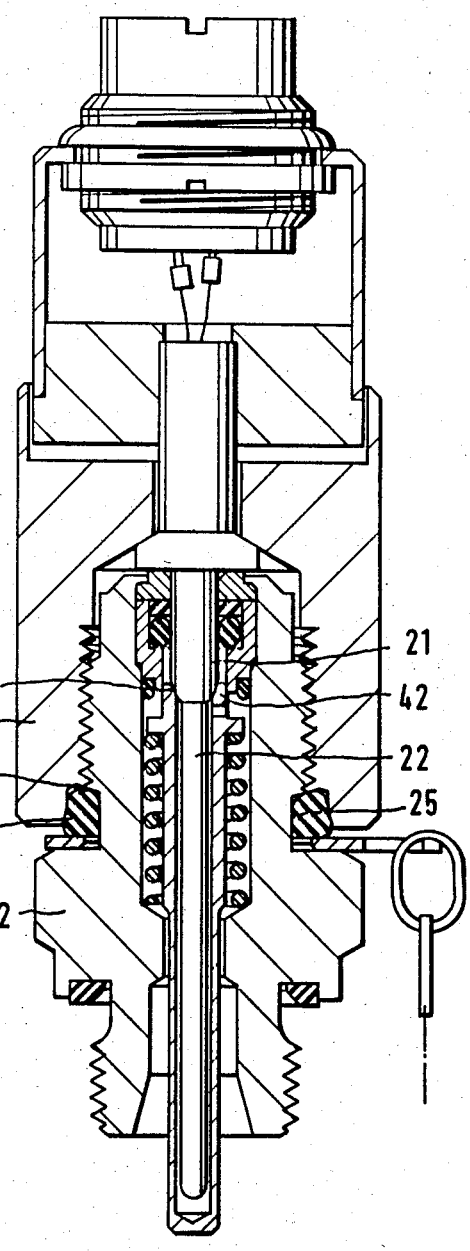
FIG. 3 shows a longitudinal section through the measurement coupling according to the invention, for picking up temperatures and pressures, with a temperature sensor connected for temperature and/or thermostatic measurements.

A radial transverse bore 11 or a transverse slot 33 is located in the wall of the valve body 1, and can be located in the lower part of the valve body 1, as can be seen from FIG. 6, or can also be arranged in the wall of the guide part 42 of the valve body 1, as can be gathered from FIGS. 1-3.

In this example of an embodiment, a flow slot channel 4, 41 is formed between the valve body 1 and the coupling bushing 2, up to the radial transverse bore 11 or the transverse slot 33, so that the fluid medium can penetrate from the system through the flow slot channel 4, 41 and through the transverse slot 33 or the transverse bore 11 into the interior of the valve body 1.

The valve body 1 has a collar 7 which is formed about the valve body 1, forms a sealing face 8, and at the same time acts as a stop 9 for the cylindrical compression spring 10.

The end face 13 of the valve body 1 is formed, according to the examples of embodiments of FIGS. 1-3, as a conical mouth, while FIG. 4 shows an embodiment with a right planar face.

The valve body 1 is furthermore provided with a stop shoulder 18, which is constructed such that it strikes against the stop face 19 of the coupling sleeve 2 while the guide part 12 still remains in the bushing bore 20, giving secure mounting and guiding of the valve body 1.

The bore 17 of the lower portion of the coupling bushing 2 is provided with a greater diameter than the remaining portion of the bore, so that a cylindrical vortex chamber 16 is formed with the tapered part of the valve 1.

Due to this, the lower portion of the valve body 1 is bathed by the fluid, so that heat transfer is thereby favored and thus even short-term temperature changes can be measured.

In an embodiment which is not shown in more detail, the vortex chamber 16 can have a conical enlargement in its lower portion which faces the fluid medium, so that the said effect is in this manner still further magnified, i.e., can be further improved.

FIG. 2 shows a measurement coupling which is equipped as a pressure measurement coupling. A pressure hose 32, with a corresponding screwed cap, is here screwed to the coupling bushing 2. A nipple is integrated with the pressure hose 32; the valve body 1 is pushed open by means of it, so that the pressure connection to a manometer (not shown) is established.

As can be gathered from FIG. 3, the electrical temperature sensor 21, which can be screwed on, is provided with a tapering sensor tip 22 which has a conical transition 23.

A torque securement ring 24 is arranged under prestress in the thread relief 25 of the coupling sleeve 2 and the recess 26 of the screwed cap 27: see in this connection particularly Figure 1, but also FIGS. 2 and 3.

FIG. 5 shows a partial section A - B from FIG. 1. The guide aperture 15, which is formed between the coupling sleeve 2 and the valve body 1, is enlarged by notches 31 such that a free throughflow cross section results which corresponds to the nominal width of the pressure hose 32 which is to be connected.

An O-ring 28 and support ring 29 are arranged in the widened bore 30 of the bushing guide part 12.

The coupling thread 34 is preferably developed as a buttress thread.

If no pressure testing and measurement work is to be carried out, the coupling bushing 2 has the screwed cap 27 screwed to it and is thus protected from contamination.

If the pressure of the system is to be measured, a hose nipple which is fast to a pressure hose 32 is screwed onto the coupling bushing, and the working pressure is indicated on a manometer (not shown).

A corresponding measurement can also be carried out with an electrical pressure sensor which is connected fixedly to a screwed cap and a hose nipple.

If the temperature of the fluid medium is to be measured, the said pressure measurement devices are unscrewed, and the temperature sensor 21 (see FIG. 3 in this connection) is introduced with its sensor tip 22 into the valve body 1 and is screwed to the coupling bushing 2 by means of a screwed cap. The sensor tip 22 is in direct contact with the fluid medium, and since in addition the valve body 1 is immersed in the fluid stream of the system, not only the temperature of the system, but also each temperature change, can be immediately measured and indicated.

The fluid system can thus be monitored with precision as regards the course of its temperature and pressure, without being switched off and without any change or effect due to insertion of the pressure or temperature probes. Since the measurement coupling is constantly connected to the system, the measurements can be carried out at any time without special preparations.

Furthermore it is of great advantage that even conventional measurement couplings already on the market can be used for pressure and temperature measurements simply by changing the valve body.

We claim:

1. A measurement coupling for taking working pressures and temperatures of fluid media in fluid systems, comprising:
   a coupling bushing under duct pressure in the built-in state; a support ring and an O-ring arranged in a widened portion of an internal bore of a hollow guide insert arranged within a bore of said coupling bushing;
   a spring-loaded and mechanically actuatable check valve arranged within the bore of said coupling;
   said check valve including a valve body exhibiting a valve body cylindrical bore and a closed bottom face; said valve body having an end exhibiting said closed bottom face and which faces the fluid system and is prolonged beyond the coupling bushing; and
   a radial transverse bore located in a wall of the valve body.

2. A measurement coupling according to claim 1, wherein the radial transverse bore is located in the wall of a guide part of the valve body and, wherein a flow slot channel is formed between the valve body and the coupling bushing as far as said radial transverse bore.

3. A measurement coupling according to claim 2, wherein a collar is formed about the valve body, said collar forming a sealing face and simultaneously acting as a stop for a cylindrical compression spring.

4. A measurement coupling according to claim 3, wherein an open upper end face of the valve body is constructed as a right planar face.

5. A measurement coupling according to claim 4, wherein said transverse bore is a transverse slot adjacent to and contiguous with an open upper face of said valve body.

6. A measurement coupling according to claim 3, wherein an open upper end face of the valve body is constructed as a conical mouth.

7. A measurement coupling according to claim 6, wherein said transverse bore is a transverse slot adjacent to and contiguous with an open upper face of said valve body.

8. A measurement coupling according to claim 3, wherein the valve body has a stop shoulder which strikes against a stop face arranged within the bore of said coupling bushing.

9. A measurement coupling according to claim 8, wherein a lower part of the bore of the coupling bushing has a greater diameter than a remaining portion of the bore, such that a cylindrical vortex chamber is formed within a tapered portion of the valve.

10. A measurement coupling according to claim 9, wherein the vortex chamber has a conical enlargement located in its lower part and which faces the fluid media.

11. A measurement coupling according to claim 8, wherein said transverse bore is a transverse slot adjacent to and contiguous with an open upper face of said valve body.

12. A measurement coupling according to claim 3, further including an electrical temperature sensor having a tapered sensor tip and a conical transition removably arranged within said valve body cylindrical bore.

13. A measurement coupling according to claim 3, wherein a torsional securement ring is arranged, under prestress, in a thread relief of the coupling bushing and a recess of a screwed cap.

14. A measurement coupling according to claim 13, wherein a guide aperture in combination with a plurality of notches located in the coupling bushing, gives a free through-flow cross-section corresponding to the nominal width of a pressure hose connected to said coupling.

15. A measurement coupling according to claim 14, wherein a coupling thread is developed as a buttress thread.

16. A measurement coupling according to claim 3, wherein said transverse bore is a transverse slot adjacent to and contiguous with an open upper face of said valve body.

17. A measurement coupling according to claim 2, wherein said transverse bore is a transverse slot adjacent to and contiguous with an open upper face of said valve body.

18. A measurement coupling according to claim 1, wherein said transverse bore is a transverse slot adjacent to and contiguous with an open upper face of said valve body.

* * * * *